(12) United States Patent
Mitrovic et al.

(10) Patent No.: US 11,875,094 B2
(45) Date of Patent: Jan. 16, 2024

(54) MINIMIZATION FUNCTION FOR FRICTION SOLVING

(71) Applicant: Microsoft Technology Licensing, LLC, Redmond, WA (US)

(72) Inventors: Petar Mitrovic, Belgrade (RS); Eoin Mcloughlin, Dublin (IE); Maxwell Simon Abernethy, San Francisco, CA (US); Milan Simic, Belgrade (RS); Milos Jovanovic, Belgrade (RS); Nikola Nikolic, Belgrade (RS); Oliver M. Strunk, Munich (DE); Pavle Josipovic, Belgrade (RS); Rory Mullane, Dublin (IE); Janos Benk, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 972 days.

(21) Appl. No.: 16/576,669

(22) Filed: Sep. 19, 2019

(65) Prior Publication Data

US 2021/0089628 A1   Mar. 25, 2021

(51) Int. Cl.
*G06F 30/20* (2020.01)
*G06F 111/04* (2020.01)
*G06F 111/10* (2020.01)

(52) U.S. Cl.
CPC .......... *G06F 30/20* (2020.01); *G06F 2111/04* (2020.01); *G06F 2111/10* (2020.01); *G06T 2210/21* (2013.01); *Y10S 345/958* (2013.01)

(58) Field of Classification Search
CPC .................................................. Y10S 345/958
See application file for complete search history.

(56) References Cited

U.S. PATENT DOCUMENTS 5,432,718 A * 7/1995 Molvig ................. G06F 15/803
702/50
5,594,671 A * 1/1997 Chen ..................... G06F 15/803
702/50

(Continued)

FOREIGN PATENT DOCUMENTS

EP          1255230 A2    11/2002

OTHER PUBLICATIONS

Daniel Melanz et al., A comparison of numerical methods for solving multibody dynamics problems with frictional contact modeled via differential variational inequalities, Computer Methods in Applied Mechanics and Engineering, vol. 320, 2017, pp. 668-693, ISSN 0045-7825 (Year: 2017).*

(Continued)

*Primary Examiner* — Akash Saxena
(74) *Attorney, Agent, or Firm* — Alleman Hall Creasman & Tuttle LLP

(57) ABSTRACT

A physics engine executed on a processor to simulate real-time rigid body dynamics of a simulated physical system with a minimizing function between initial velocities and intermediate solver velocities is provided. The physics engine may be configured to iteratively loop through a collision detection phase, an iterative solving phase, updating phase, and display phase. The physics engine may be configured to store initial velocities for colliding pairs of bodies. The physics engine may be further configured to determine intermediate solver velocities for the colliding pairs of bodies based on accumulated results of constraint solving for each pair of bodies. The physics engine may be further configured to calculate friction velocities for that colliding pair of bodies based on the stored initial velocities and the intermediate solver velocities using a minimization (Continued)

function, and apply a friction force or impulse based on the calculated friction velocities.

21 Claims, 8 Drawing Sheets

(56) References Cited

U.S. PATENT DOCUMENTS

| | | | | |
|---|---|---|---|---|
| 5,625,575 | A * | 4/1997 | Goyal | G06F 30/20 |
| | | | | 703/6 |
| 7,610,182 | B2 * | 10/2009 | Smith | G06F 30/20 |
| | | | | 703/2 |
| 7,933,858 | B2 * | 4/2011 | Stam | G06F 30/20 |
| | | | | 703/2 |
| 7,936,355 | B2 * | 5/2011 | Moravanszky | G06T 13/20 |
| | | | | 345/473 |
| 8,223,155 | B2 * | 7/2012 | Cohen | G06F 30/20 |
| | | | | 345/474 |
| 8,279,227 | B2 * | 10/2012 | Cohen | G06T 13/20 |
| | | | | 345/473 |
| 9,311,745 | B2 * | 4/2016 | Andrade | G06T 17/00 |
| 9,440,148 | B2 * | 9/2016 | Bond | A63B 13/80 |
| 10,866,632 | B2 * | 12/2020 | Johnston | G02B 7/002 |
| 11,030,363 | B2 * | 6/2021 | Strunk | G06F 30/20 |
| 11,256,835 | B2 * | 2/2022 | Voroshilov | G06F 30/20 |
| 11,615,222 | B2 * | 3/2023 | Mitrovic | G01G 19/414 |
| | | | | 703/6 |
| 2003/0187626 | A1 * | 10/2003 | Catto | G16C 10/00 |
| | | | | 703/11 |
| 2004/0075662 | A1 * | 4/2004 | Baraff | G06T 13/40 |
| | | | | 345/473 |
| 2006/0235659 | A1 * | 10/2006 | Stam | G06T 13/20 |
| | | | | 703/2 |
| 2007/0085851 | A1 * | 4/2007 | Muller | G06T 13/20 |
| | | | | 345/474 |
| 2008/0270092 | A1 * | 10/2008 | Cohen | G06F 30/20 |
| | | | | 703/7 |
| 2012/0123754 | A1 * | 5/2012 | Bodin | G06F 30/23 |
| | | | | 703/2 |
| 2012/0287124 | A1 * | 11/2012 | Ragozin | G06T 13/20 |
| | | | | 345/419 |
| 2013/0158965 | A1 * | 6/2013 | Beckman | G06F 30/20 |
| | | | | 345/423 |
| 2014/0244222 | A1 * | 8/2014 | Tonge | G06F 30/20 |
| | | | | 703/2 |
| 2015/0109309 | A1 | 4/2015 | Mueller-Fischer et al. | |
| 2017/0344680 | A1 * | 11/2017 | Strunk | G06F 30/20 |
| 2018/0240262 | A1 * | 8/2018 | Hagedoorn | G06T 13/00 |
| 2019/0108300 | A1 * | 4/2019 | Soler Arasanz | G06F 30/00 |
| 2021/0089629 | A1 * | 3/2021 | Mitrovic | G06F 30/20 |
| 2022/0100928 | A1 * | 3/2022 | Storey | G06F 30/20 |

OTHER PUBLICATIONS

"Friction", Retrieved From: https://en.wikipedia.org/wiki/Friction, Retrieved Date: Sep. 6, 2019, 17 Pages.

Bodin, et al., "Notes on the SPOOK Method for Simulating Constrained mechanical Systems", Retrieved from: https://www8.cs.umu.se/kurser/5DV058/VT15/lectures/SPOOKlabnotes.pdf, 2009, 11 Pages.

Catto, Erin, "Fast and Simple Physics using Sequential Impulses", In Proceedings of Games Developer Conference, 2006, 53 Pages.

Catto, Erin, "Modelling and Solving Constraints", Retreived From: http://twvideo01.ubm-US.net/o1/vault/gdc09/slides/04-GDC09_Catto_Erin_Solver.pdf, Retrieved Date: Sep. 6, 2019, 81 Pages.

"Physics for Game Programmers:Understanding Constraints", Retreived From: https://80.Iv/articles/physics-for-game-programmers-understanding-constraints/, Mar. 4, 2018, 05 Pages.

Featherstone, Roy, "Rigid Body Dynamics Algorithms", In Publication of Springer, 2008, 281 Pages.

Lacoursiere, Claude, "Using Gauss-Seidel for Multibody Problems", In the Dissertation Submitted to Department of Computing Science, Umea University, Dec. 1, 2011, 6 Pages.

Mendez, Jose Maria, "Physics 101 #3: Solvers", Retrieved From: http://blog.virtualmethodstudio.com/2017/11/physics-101-3-solvers/, Nov. 21, 2017, 7 Pages.

Mirtich, Brian Vincent, "Impulse-based Dynamic Simulation of Rigid Body Systems", In the Dissertation Submitted to University Of California, 1996, 259 Pages.

Moravanszky, et al., "Fast Contact Reduction for Dynamics Simulation", In Proceedings of Game Programming Gems, 2004, 10 Pages.

Tamis, Marijn, "3D Constraint Derivations for Impulse Solvers", Retreived Form: http://www.mft-spirit.nl/files/MTamis_Constraints.pdf, Jul. 1, 2015, 41 Pages.

Tamis, et al., "Constraint Based Physics Solver", Retreived From: http://www.mft-spirit.nl/files/MTamis_ConstraintBasedPhysicsSolver.pdf, Jun. 15, 2015, 31 Pages.

Tonge, et al., "Mass Splitting for Jitter-Free Parallel Rigid Body Simulation", In Journal of Transactions on ACM Graphics, vol. 31, Issue 4, Jul. 2012, 8 Pages.

Tonge, Richard, "Solving Rigid Body Contacts", In Proceedings of the Game Developers Conference, Mar. 5, 2012, 59 Pages.

Tournier, et al., "Stable Constrained Dynamics", In Journal of ACM Transactions on Graphics, vol. 34, Issue 4, Aug. 2015, 11 Pages.

Melanz, et al., "A Comparison of Numerical Methods for Solving Multibody Dynamics Problems with Frictional Contact Modeled via Differential Variational Inequalities", In Journal of Computer Methods in Applied Mechanics and Engineering, vol. 320, Jun. 15, 2017, pp. 668-693.

"International Search Report and Written Opinion Issued in PCT Application No. PCT/US20/038547", dated Sep. 28, 2020, 13 Pages.

* cited by examiner

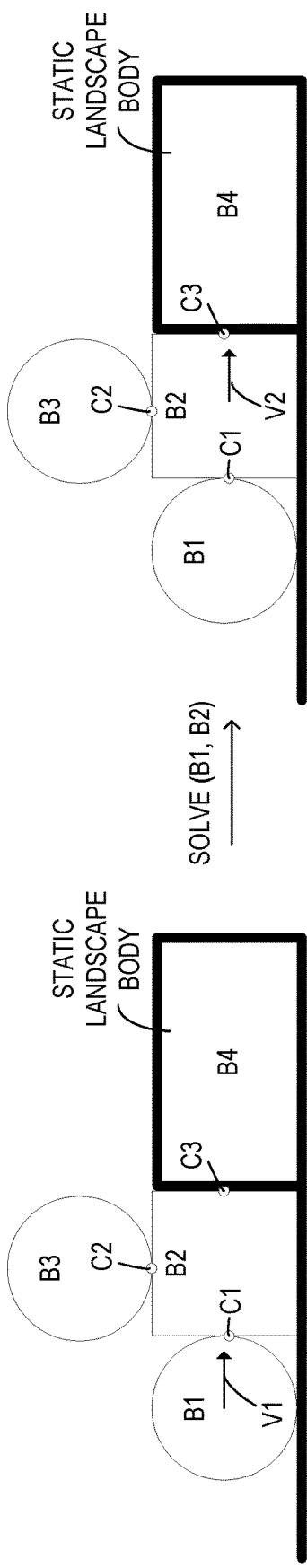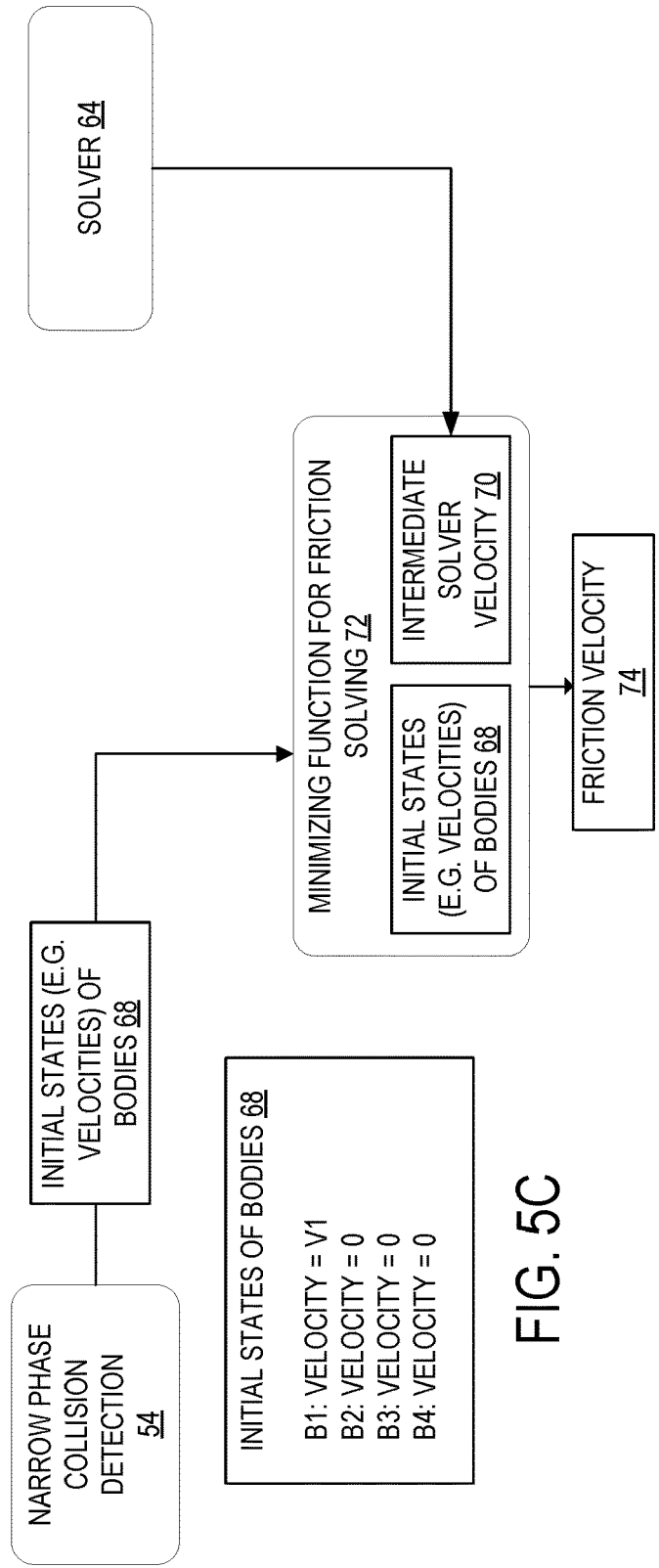
FIG. 5A
FIG. 5B
FIG. 5C

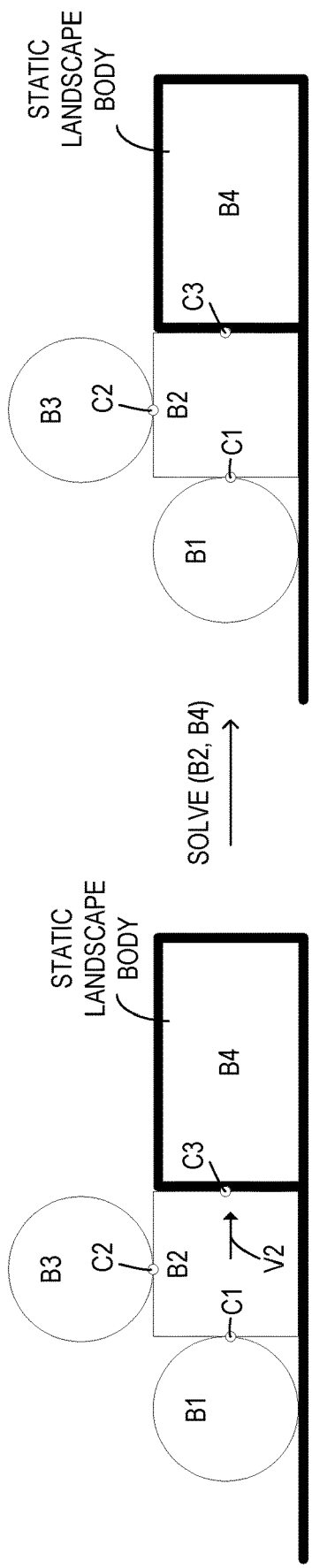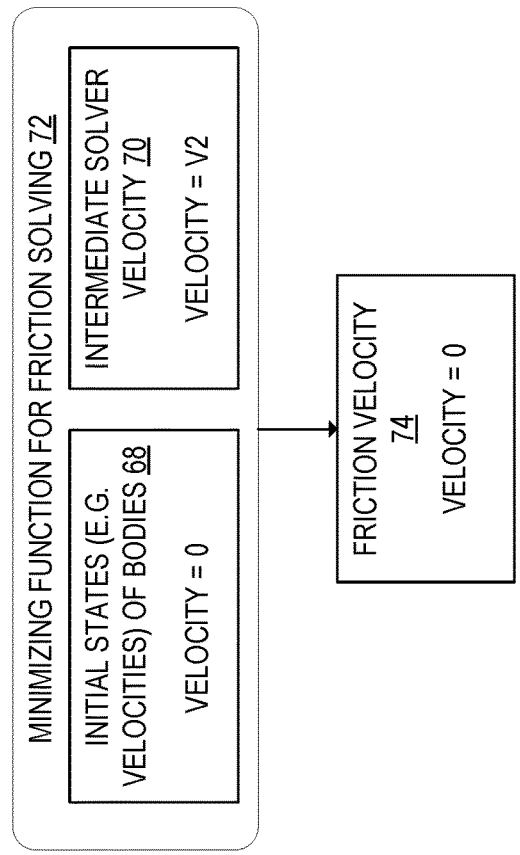
FIG. 6A
FIG. 6B

MINIMIZATION FUNCTION FOR FRICTION SOLVING

BACKGROUND

Physics engines with real-time iterative rigid body dynamics solvers are used in a variety of computer graphics applications, to simulate the motion of rigid bodies in real-time in a simulated physical environment. Such solvers do not find perfect solutions, but rather find approximate solutions. It is a challenge therefore, of such solvers to find approximate solutions quickly, efficiently, and sufficiently accurately for the needs of the application. One area in particular that physics engines, particularly stateless physics engines, face challenges is the handling of potential artifacts that may occur due to intermediate forces determined in solver iterations. These challenges, the manner in which they are addressed, and the attendant potential beneficial technical effects thereof are further discussed below.

SUMMARY

According to one aspect of the present disclosure, a computing device is provided which includes a processor configured to execute a physics engine to simulate real-time rigid body dynamics of a simulated physical system including a plurality of bodies. The physics engine may be configured to iteratively loop through a collision detection phase, an iterative solving phase, updating phase, and display phase. The physics engine may further be configured to, in a current collision detection phase, identify colliding pairs of bodies of the plurality of bodies, determine collision information including a plurality of constraints for the identified colliding pairs of bodies, and store initial velocities for the colliding pairs of bodies. The physics engine may further be configured to, in a current iterative solving phase, for each solver iteration, for one or more colliding pairs of bodies, for one or more constraints between that colliding pair of bodies, solve that constraint, and accumulate results of constraint solving. For the one or more colliding pairs of bodies, the physics engine may be further configured to determine intermediate solver velocities for that colliding pair of bodies based on the accumulated results of constraint solving, calculate friction velocities for that colliding pair of bodies based on the stored initial velocities and the intermediate solver velocities for that colliding pair of bodies using a minimization function, and apply a friction force or impulse based on the calculated friction velocities for that colliding pair of bodies. The physics engine may further be configured to, in an updating phase, update positions of the colliding pairs of bodies based on a result of the current iterative solving phase. The physics engine may further be configured to, in a display phase, output data representations of the plurality of bodies to a display associated with the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A and 5B are simplified diagrams of a plurality of colliding bodies, showing an effect of the minimizing function on friction solving.

FIG. 5C illustrates an example process for the solver of the physics engine of FIG. 1 for calculating friction velocities using the minimizing function.

FIGS. 6A and 6B are simplified diagrams of the plurality of bodies of FIGS. 5A and 5B, showing a result of the using the minimizing function for friction calculations.

DETAILED DESCRIPTION

Physics engines with real-time iterative rigid body dynamics solvers are used in a variety of computer graphics applications, to simulate the motion of rigid bodies in real-time in a simulated physical environment. Each simulation step of these physics engines typically includes collision detection, applying impulses or forces or positioned based dynamics (i.e. solving), and integrating bodies. One example solver for a physics engine is a Gauss-Seidel solver. However, because Gauss-Seidel and other types of iterative solvers may solve constraints separately, these solvers may potentially produce intermediate states and velocities that are not representative of actual states of the rigid bodies being simulated.

These intermediate states and velocities may potentially cause issues with friction calculations, which will be discussed in more detail below. These issues may potentially lead to artifacts and cause unintended behavior such as, for example, rigid bodies sliding or rolling when those rigid bodies would be expected by users to remain still, potentially degrading user experience of the application.

Typically, these issues caused by intermediate velocities are solved by introducing state for friction calculations for the physics engine. These states are stored in memory such that the produced error/artifact may be remembered and mitigated in subsequent simulation steps. However, introducing states in this manner may increase memory resource consumption of the physics engine and may cause issues with implementation of the solver using a graphics processing unit (GPU) or another type of hardware acceleration device.

Figure 1:
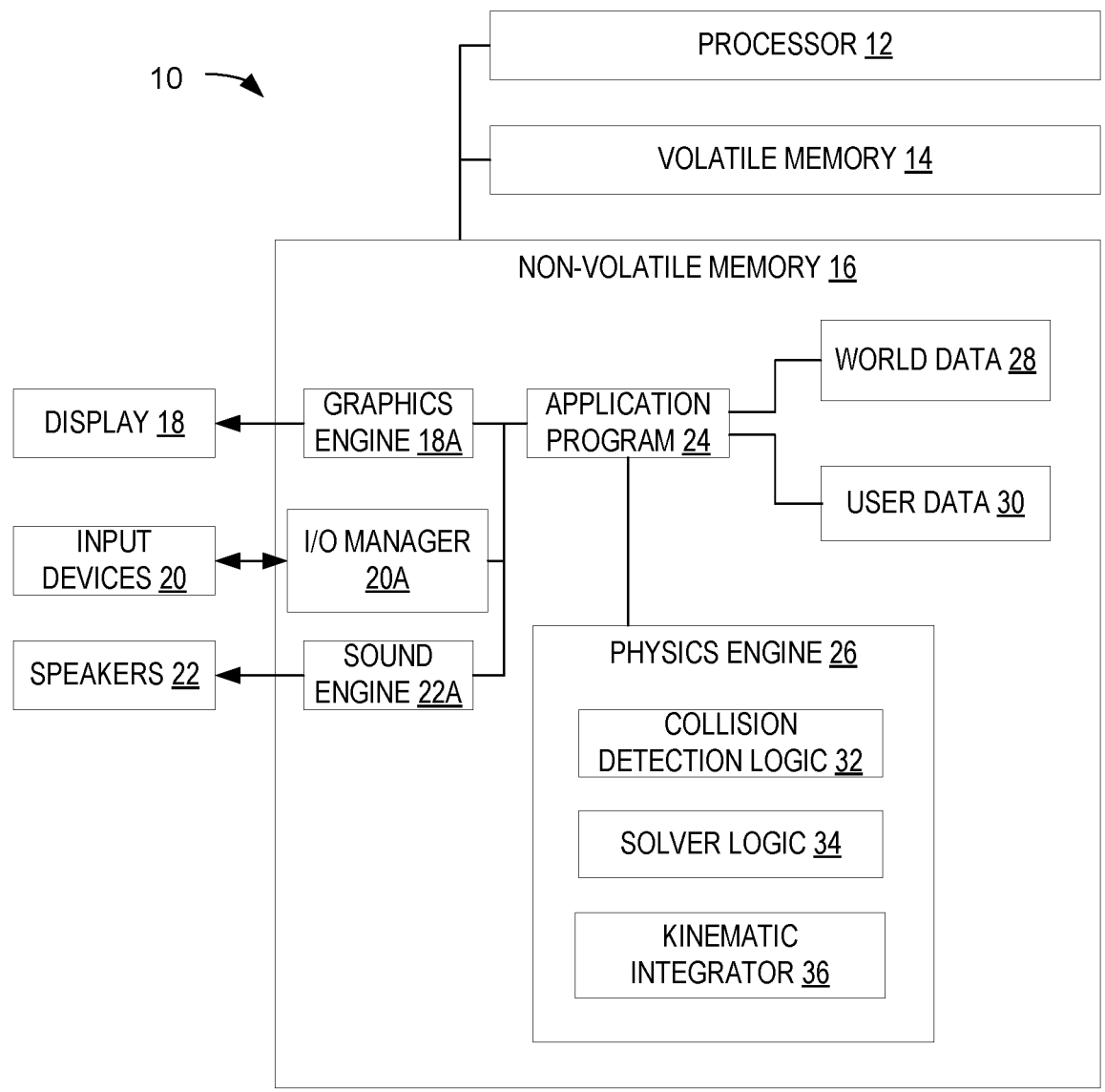
FIG. 1 shows a computing device equipped with a physics engine having a rigid body dynamics solver that performs friction solving using a minimization function, according to one embodiment of the present disclosure.

To address these issues, FIG. 1 illustrates a computing device 10 configured with a stateless physics engine having a rigid body dynamics solver, according to one embodiment of the present disclosure. Computing device 10 includes a processor 12, volatile memory 14 such as RAM, non-volatile memory 16 such as a hard disk or FLASH memory, a display 18, input devices 20 such as a mouse, keyboard, touchscreen, etc., and one or more speakers 22. The processor 12 is configured to execute various software programs, such as application program 24, which are stored in non-volatile memory 16, using portions of volatile memory 14. Drivers such as a graphics engine 18A, an I/O manager 20A, and sound engine 22A enable communication between application program 24 and the display 18, input devices 20 and speakers 22, respectively. Application program 24 may be a computer game, or virtually any other type of program that utilizes a physics engine 26 that simulates real-time rigid body dynamics in response to user inputs and program logic.

Application program 24 is configured to utilize and processor 12 is configured to execute a physics engine 26 to simulate the real-time rigid body dynamics of a simulated physical system including a plurality of bodies. Data representing these physical bodies is stored as world data 28 and user data 30. It will be appreciated that physics engine 26 is provided with a minimization function for friction solving, as will be described in more detail below. At a high level, the physics engine includes collision detection logic 32, solving logic 34, and a kinematic integrator 36, which are applied iteratively by the physics engine 26 to adjust the positions and velocities of various rigid bodies in the physical system, in order to make them behave appropriately under applied forces, such as gravity, wind resistance, springs, magnetism, etc., as well as observe physical constraints, such as non-penetration of other rigid bodies, joint constraints, etc. Collision detection logic 32, solver logic 34, and kinematic logic 36 are typically software programs executed by the processor 12, which may be a multi-threaded and possibly multi-core central processing unit (CPU). However, in some embodiments portions or all of the logic of the physics engine 26 described herein may be implemented in firmware or hardware, for example on a graphical processing unit (GPU). Further, as will be described in more detail below, the physics engine 26 may be stateless and deterministic, and portions or all of the solver logic 34 may be accelerated by a GPU.

Figure 2:
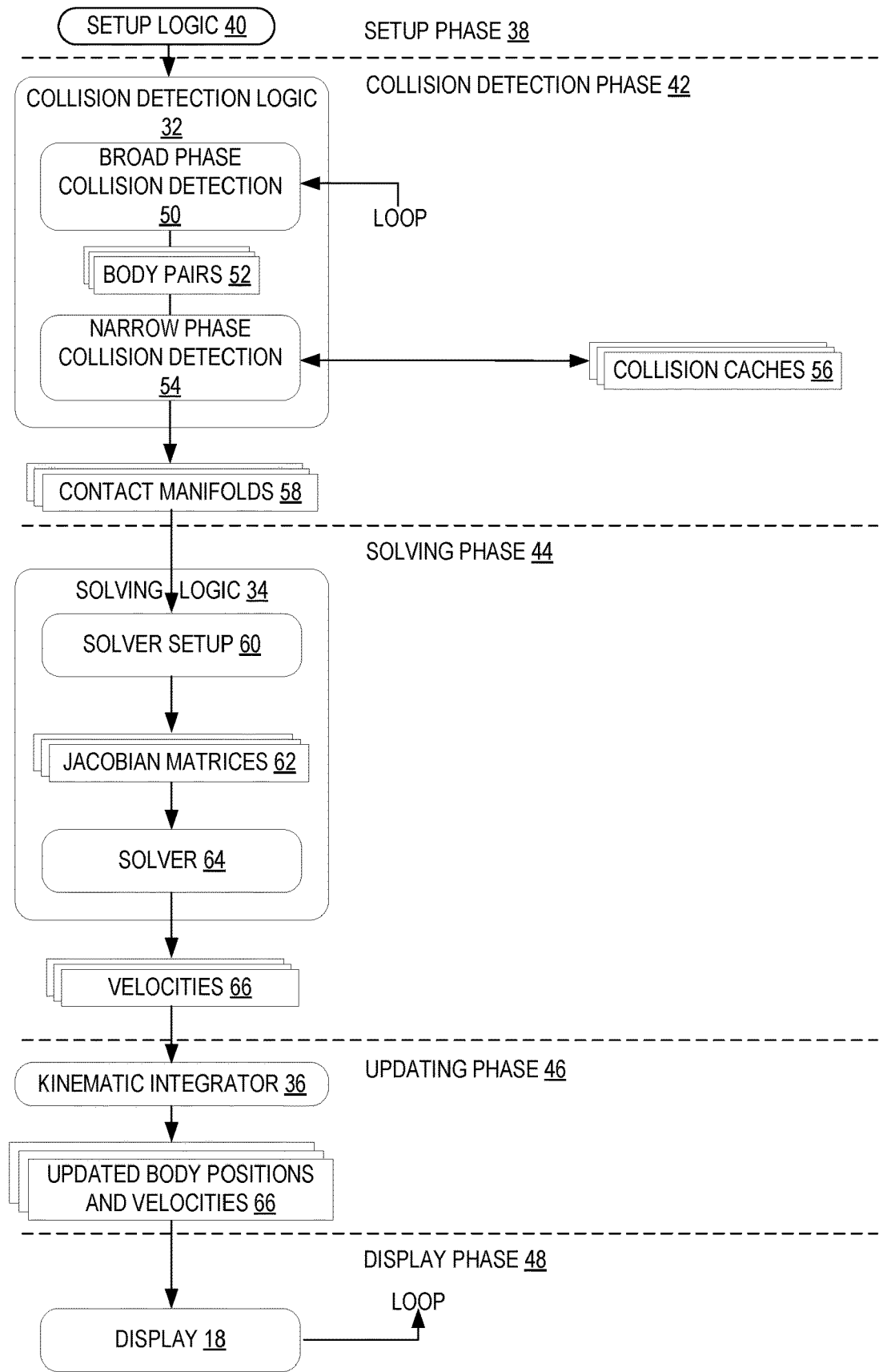
FIG. 2 shows a process flow that may be implemented by the computing device of FIG. 1 for performing friction solving.

FIG. 2 illustrates a real-time rigid body simulation by the physics engine 26 that uses an iterative solver. The physics engine 26 is stateless and deterministic, and uses an iterative solver, such as, for example, a Gauss-Seidel solver, or another type of iterative solver that solves constraints separately and passes the results of one constraint solve as input to the next constraint solve in the iteration. As discussed above, these solvers may potentially produce intermediate states and velocities that are not representative of actual states of the rigid bodies being simulated, which may potentially cause issues with friction calculations. Typical physics engines introduce states for the solvers that are stored in memory such that the produced error/artifact may be remembered and mitigated in subsequent simulation steps. In contrast, the physics engine 26 according to one embodiment of the present disclosure is stateless. As used herein, the term "stateless physics engine" is a physics engine that does not introduce extra state outside of the expected physical state consisting of body positions and velocity. For example, introducing states that include information regarding produced errors/artifacts during the solver phase would be an extra state, and such a physics engine would therefore not be "stateless". In order to mitigate the potential issues with friction calculations caused by intermediate velocities produced by the solver when iteratively solving each constraint, the physics engine 26 may implement a minimization function for solving friction, as will be described in more detail below.

As shown in FIG. 2, the simulation begins with a setup phase 38 implemented by setup logic 40 executed on processor 12, in which the objects and their positions, orientations and velocities are initially set prior to kinematic simulation. Following the setup phase 40, the simulation enters into a loop, during which a collision detection phase 42 and a solving phase 44 are iteratively executed by the collision detection logic 32 and solving logic 34 respectively. During the collision detection phase 42, contact information for touching bodies is generated, and during the solving phase 44 the system of body velocities and constraints imposed by contacts are computed. At the end of the solving phase 44, the forces are applied to the bodies in examples where the physics engine 26 is a force-based physics engine. In another example, the physics engine 26 may be a position-based physics engine, and at the end of the solving phase 44, the calculated changes in positions for each body may be applied. The positions and velocities of the bodies are updated in an updating phase 46. The results (i.e., a graphical representation of the updated positions of the bodies) are displayed in a display phase 48. Once the results are displayed, the process loops back to the collision detection phase 42. These phases will now be explained in more detail.

Collision Detection

The collision detection phase 42 generates contact points between any touching or nearly touching rigid bodies. Typically, this is done by a broad collision detection phase 50 which finds pairs 52 of potentially colliding bodies, then a narrow collision detection phase 54 which generates contact information for each pair 52 and stores it in a collision manifold 58, which is a data structure designed to hold data regarding each collision between a pair of bodies 52. The contact information stored in the collision manifold 58 may include information regarding constraints for each pair of bodies 52. For example, the contact information may include a separating plane, a separating normal vector, any number of contact point positions and their penetrating or separating distances (i.e., the positive (separating) or negative (penetrating) distances between the pair of bodies 52 at the point of contact). In some examples, the constraints may take the form of attachment points between pairs of bodies 52. However, it should be appreciated that other types of constraints may be identified during the collision detection phase 42 and information regarding those constraints may be stored in the contact manifolds 58. In order to improve convergence to a stable solution during the solving phase 44 for friction calculations, some narrow phase working data is stored alongside the collision caches 56 and used in subsequent simulation steps. In some examples, the physics engine 25 may not include collision caches 56.

Solving Constraints

The solving phase 44 implemented by solver logic 34 first creates a set of mathematical constraints (known as Jacobian matrices or simply Jacobians) based on the generated contact manifolds. Solver setup 60 involves converting the position and velocity data for the rigid bodies into Jacobian matrices 62, which can be processed in a computationally efficient manner in real time by the solver 64. In one example, the constraints are velocity-based, meaning that they are constraints on the velocities of the two contacting bodies. The solver 64 then solves for all the body velocities 66 and constraints and finally applies the resulting impulses or forces back to the bodies. However, it should be appreciated that the solving logic 34 of the physics engine may implement other types of simulation logic. For example, in a position-based physics engine, the constraints may be position-based, meaning that they are constraints on the positions of the two contacting bodies and contact points between those contact bodies. The solver 64 may solve for all of the body positions and constraints, and apply changes in position on the bodies. As a change in position is being applied to the bodies over a discrete period of time covered by the simulation step, velocities for the bodies may also be derived in a position-based physics engine.

In real-time physics engines such as physics engine 26, it is typically too computationally expensive to solve an unbounded system of constraints simultaneously, so instead an iterative algorithm is employed by the solver 64, such as a Gauss-Seidel algorithm. Instead of solving all constraints at once, a Gauss-Seidel algorithm solves each constraint in turn, repeating the process several times, so that the solver 64 converges towards to a stable solution. It will be appreciated that other algorithms may also be used instead of a Gauss-Seidel algorithm, such as other types of iterative solvers where the result of constraint solving for one body is passed as input to the constraint solving for the next body in the form of intermediate states such as velocities or changes in position.

Handling Friction

While solving constraints for each contact point between each pair of colliding bodies using an iterative algorithm such as a Gauss-Seidel algorithm, forces or impulses are applied to the bodies and accumulated for each contact point. For example, to solve a non-penetration constraint, the solver may apply a force or impulse at a contact point to prevent penetration of that contact point into one of the colliding pairs of bodies. As another example, to solve an attachment constraint, the solver may apply a force or impulse to ensure that the contact point does not move relative to the two pairs of bodies. It should be appreciated that other types of constraints may be handled by the solver.

The accumulation of these forces or impulses being applied to a body may result in an intermediate velocity for that body. That intermediate velocity may be used as input for a next step of constraint solving. As further constraints are solved, and further forces or impulses are applied to bodies, these intermediate velocities may be overwritten in the subsequent constraint solving steps. Thus, the intermediate velocities do not necessarily reflect a physical reality of the bodies. That is, a body that has not moved during a simulation step may have had a non-zero intermediate velocity at some point during the solving phase that was overwritten during a subsequent constraint solve. Similarly, a position-based physics engine may have intermediate positions and states of the bodies caused by applying changes in position to bodies based on constraint solving. However, as discussed above, these intermediate states and velocities may potentially cause issues with friction calculations, which may lead to artifacts and cause unintended behavior such as, for example, rigid bodies sliding or rolling when those rigid bodies would be expected by users to remain still, potentially degrading user experience of the application.

Figure 3A:
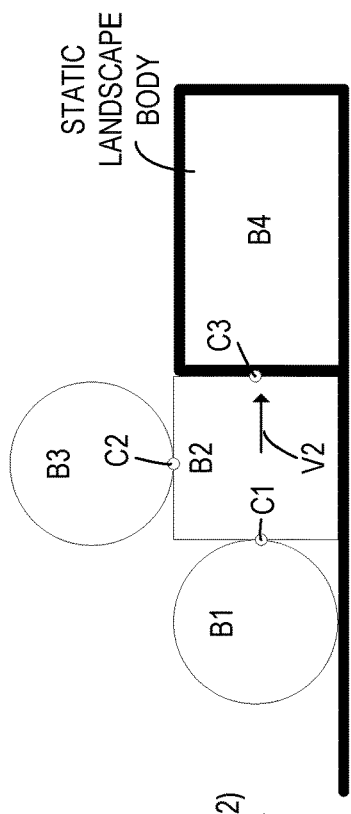
FIGS. 3A, 3B, 3C, and 3D are simplified diagrams of a plurality of colliding bodies, showing an effect that intermediate solver velocities have on friction solving.

FIGS. 3A-D illustrate an example friction solve that is affected by an intermediate velocity that causes unintended behavior. In FIGS. 3A, B, C, and D, the simulated physical system includes four colliding bodies labeled B1, B2, B3, and B4. In the illustrated example, bodies B1-B3 are free bodies that may move, and body B4 is a static landscape body that does not move. As shown, there are three colliding pairs of bodies 52, pair (B1, B2), pair (B2, B3), and pair (B2, B4). The solving logic 34 of the physics engine may iteratively solve each of these colliding pairs of bodies 52 in a solving order that may be determined according to any suitable heuristic. As a specific example, the solving logic 34 may solve the colliding pairs of bodies 52 in order of body identifiers. For example, pairs for body B1 may be solved before pairs for body B4. However, it should be appreciated that this ordering is merely exemplary, and that other methods and techniques for ordering the colliding pairs of bodies 52 for solving may be used by implemented by the solving logic 34.

FIG. 3A shows an initial state of the simulated physical system before the solving phase 44. As illustrated, the body B1 has an initial velocity V1 directed toward the body B2. During the collision detection phase 42, contact information including a plurality of contact points C1, C2, and C3 are determined and stored in the contact manifolds 58. The physics engine 26 may then process the contact information in the contact manifolds 58 as discussed above using a solving logic 34 during a solving phase 44.

Figure 3C:
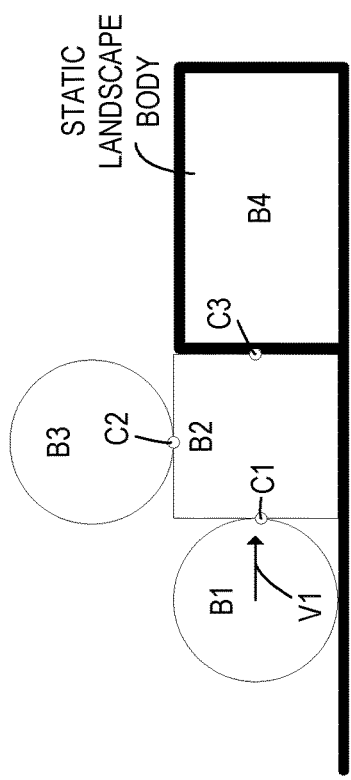
Figure 3B:
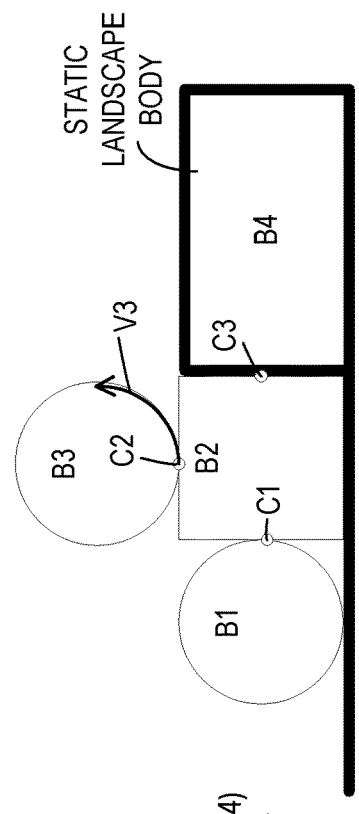

FIG. 3B shows a result of solving the constraint for the contact point C1 between the pair of bodies (B1, B2). In this example, to solve the constraint, the solving logic 34 may determine a force or impulse to be applied at the contact point to prevent penetration of the contact point C1 into the body B2. For example, the solving logic 34 may be configured to calculate a point relative velocity for that contact point C1, and apply a force or impulse to that contact point C1 based on the point relative velocity to prevent penetration of the contact point C1 into the colliding pair of bodies (B1, B2). The illustrated example only includes one contact point between the pair of bodies (B1, B2). However, it should be appreciated that any suitable number of contact points may be determined for each body pair 52 identified during the collision detection phase 42. The solving logic 34 may solve each constraint between the colliding pair of bodies (B1, B2), and accumulate applied forces or impulses for that colliding pair of bodies.

As shown in FIG. 3B, the accumulation of the applied forces or impulses for the colliding pair of bodies (B1, B2) results in an intermediate solver velocity V2 for the body B2. In an example where the simulated physical system is elastic, the body B1 may potentially also have an intermediate solver velocity (not shown) from bouncing off of the body B2. After solving the constraints for the colliding pair of bodies (B1, B2), the solving logic 34 may then solve constraints for the next colliding pair of bodies (B2, B3).

FIG. 3C shows a result of solving the constraint for the contact point C2 between the colliding pair of bodies (B2, B3). In the illustrated example, there may be two components to solving for the contact point C2. In a first component, if the simulated physical system includes gravity, then the body B3 may have a downward velocity (not shown). To solve for this constraint, the solving logic 34 may apply an impulse or force to the contact point C2 to counteract the downward velocity and prevent penetration of the contact point C2 into the pair of bodies (B2, B3).

In a second component, the solving logic 34 may include a friction solve for the contact point C2 between the pair of bodies (B2, B3). At this step of the solving phase 44, the body B2 has the intermediate solving velocity V2. For friction solving, the solving logic 34 may determine a force or impulse to be applied to the contact point C2 to reduce the relative point velocity at the contact point C2 to zero or nearly zero. As the body B2 currently has an intermediate solver velocity V2 that is non-zero, the relative point velocity at the contact point C2 is also non-zero. Thus, after friction solving, the solving logic 34 applied a force or impulse at the contact point C2 that will reduce the relative point velocity to zero, which results in the body B3 having an intermediate solver velocity V3 that has angular components that cause the body B3 to rotate.

Figure 3D:
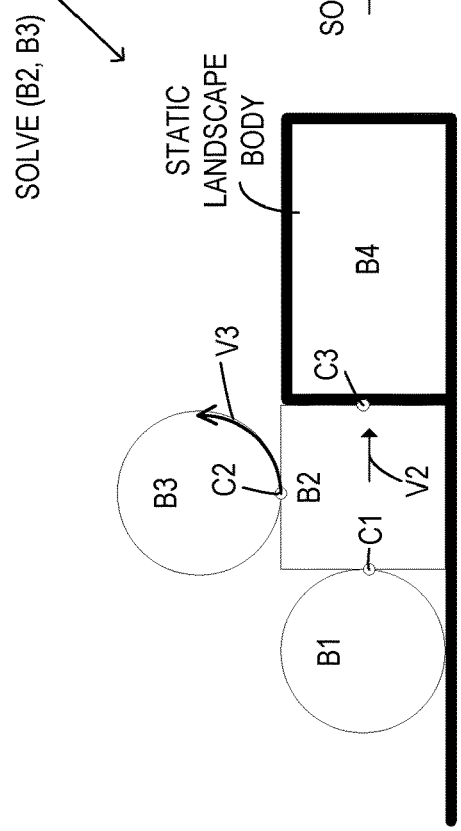

FIG. 3D shows a result of solving the constraint for the contact point C3 between the colliding pair of bodies (B2, B4). As the body B4 is a static landscape body, no velocities may be transferred to the body B4 from the collision with the body B2. Thus, when solving for the constraint for the contact point C3, the solving logic 34 will apply a force or impulse to prevent penetration of the contact point C3 into the body B4, which will result in the intermediate solving velocity V2 of the body B2 being counteracted. At this point in time, all of the constraints in the simulated physical system have been solved. As shown in example of FIGS. 3A-D, the body B2 did not actually move. That is, at the end of the simulation step, the body B2 does not have any velocity, as would be expected in a non-elastic system due to the static landscape body B4.

However, even though the body B2 did not move in this simulation step, the body B3 has gained the velocity V3 as a result of the friction solve for the contact point C2 that occurred while the body B2 temporarily had the intermediate solver velocity V2. As the body B2 is not moving, the end result of the body B3 having a velocity V3 is an error. Typically, to mitigate these types of artifact/errors occurring from friction solving, physics engines will introduce extra states for the simulation that are stored and used to monitor these errors and provide feedback to the solving process for the next simulation step. However, as discussed above, introducing extra states to propagate information about errors that occurred during the iterative solving has a number of drawbacks.

Introducing extra state to store information about each artifact/error that occurs during a particular solving step increases memory consumption, which increases as the number of colliding bodies increase. Further introducing extra states may potentially cause the physics engine to be non-deterministic. That is, simulations for the same initial setup of rigid bodies may have different results depending upon the extra states used in those simulations, causing the simulation to appear non-deterministic. This issue of extra states affecting simulation results may cause significant problems for multi-player applications.

For example, multi-player applications may be implemented by computer systems that include a plurality of client devices in communication with a server device. Each client device may implement a client-side version of the application that locally renders visuals for display. Each client application may receive the local user's inputs and send those inputs to the server device. The server device may maintain a server-side state for the world of the application, and may send updates for the server-side state of the world to the client devices. In order to provide responsive inputs, rather than waiting for the user's inputs to be sent to the sever device and waiting for an update to the server-side state of the world before rendering a result of the user's inputs, the client application may be configured to maintain a client-side state of the world that immediately implement's the user's inputs. However, the client-side state of the world may not necessarily reflect the server-side state of the world. For example, a first user's input may change a result of a second user's input.

In order to maintain the same game state for each user, incorrect client-side states of the world may be rolled back and updated to reflect the server-side state of the world. However, in typical physics engines that use extra states to correct for the artifacts/errors discussed above, all of the data for those extra states needs to be sent to the client-device in order to ensure a correct simulation of the game state on the client application. Thus, these extra states for the physics engine increase the amount of data that need to be sent between the server-device and the client devices, and may significantly increase the complexity of rolling back and updating the simulation for the application.

As another example, due to the increased calculation complexity and the increased memory consumption of the extra states, it may be difficult to implement hardware accelerated solutions using graphics processing units (GPU) for these typical physics engines.

Figure 4:
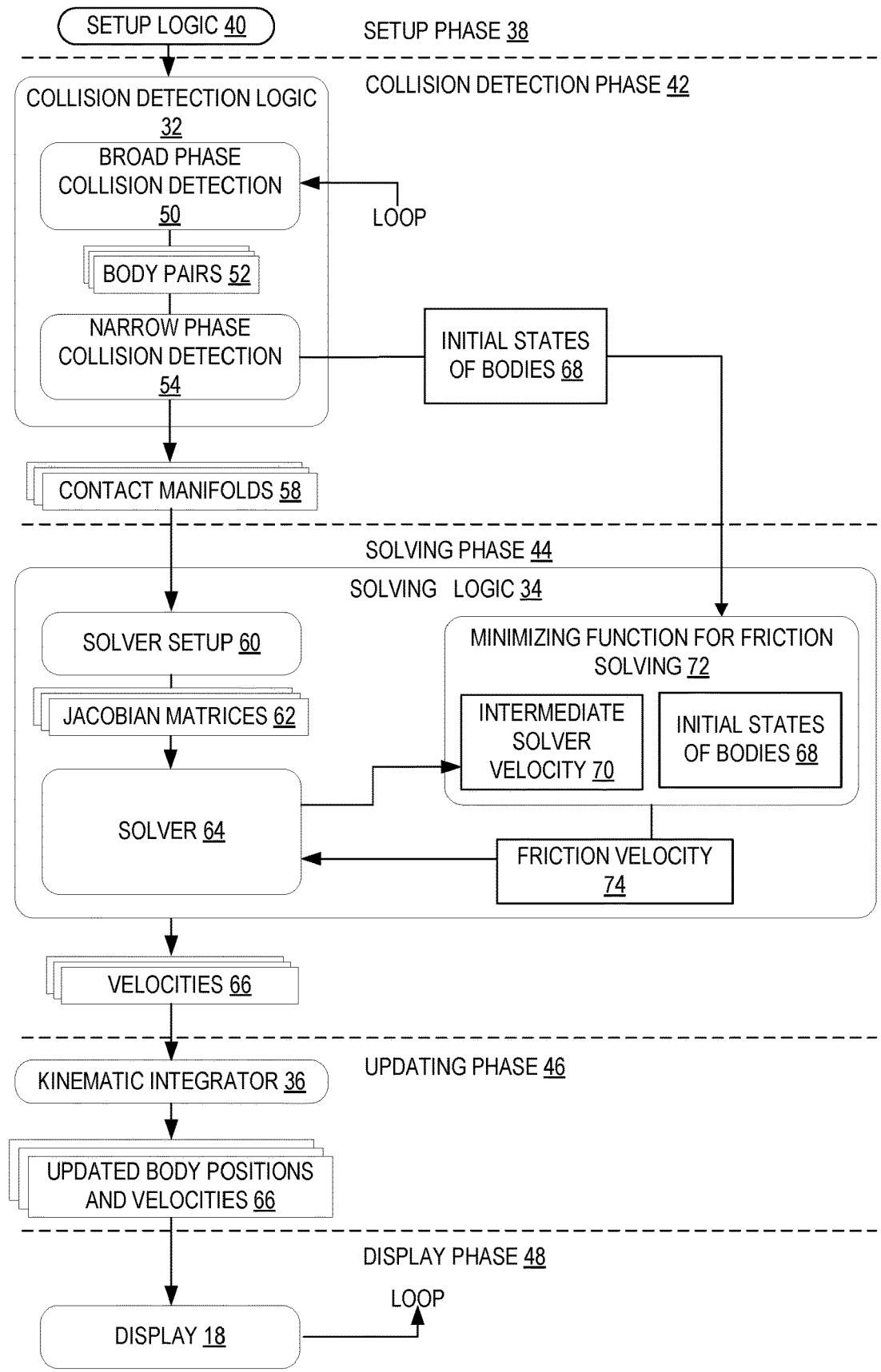
FIG. 4 is a schematic diagram illustrating a process flow executed by the solver of the physics engine of FIG. 1, by which the solver iteratively performs friction solving using a minimization function.

To address these issues, the physics engine 26 of the computing device 10 of the present disclosure is provided with a velocity minimizing function for friction solving. As illustrated in FIG. 4, the setup phase 38, collision detection phase 42, constraint solving phase 44, updating phase 46, and display phase 48 are similar to that described above with relation to FIG. 2, except as described different below.

In the setup phase 38, setup logic 40 sets initial values for the position, orientation, and velocity for the plurality of bodies in the physical simulation, in three-dimensional space of the simulation environment (e.g., game space). The physics engine 26 then iteratively loops through a collision detection phase 42, iterative solving phase 44, updating phase 46, and display phase 48, as shown. The phases occur iteratively, and the term "current" is used herein to refer to phases that occur in a current frame (i.e., timestep or simulation step).

In the current collision detection phase 42, broad phase collision detection 50 is performed to identify colliding pairs 52 of bodies of the plurality of bodies. Next, narrow phase collision detection 54 is performed for each identified pair 52, to determine collision information including a plurality of constraints for the identified colliding pairs of bodies 52. The plurality of constraints may include contact points between colliding pairs of bodies 52, and mathematical relationships/equations for those contact points that will be used for solving those constraints. Contact manifolds 58 are computed for each pair 52 of bodies by the collision detection logic, and passed to the solving logic 34.

As illustrated in FIG. 4, before entering the solving phase 44, the collision detection logic 32 may be configured to determine initial states 68 for the colliding pairs of bodies 52. For example, in a force or impulse based physics engine, the collision detection logic 32 may be configured to determine the initial velocities 68 for the colliding pairs of bodies, and store the initial velocities 68 for the colliding pairs of bodies 52 in memory. As another example, in a position-based physics engine, the positional states and changes in positions for each of the colliding pairs of bodies 52 may be determined and stored alongside the collision caches 56.

In turn, the solving logic 34 runs an initial solver setup 60 in which the contact manifolds are converted from 3D space into solver space, by computing Jacobian matrices for the contact manifold 58 for each pair 52 of colliding bodies. In each current solving phase 44, for each pair 52 of bodies for which contact manifolds 58 are produced, the iterative solver 64 separately solves each constraint of those pairs 52 of bodies. As discussed above, the iterative solver 64 accumulates the results of the constraint solving, such as, for example, by accumulating applied forces or impulses for the constraint solves. After each constraint between a pair 52 of bodies is solved, the iterative solver 64 may determine intermediate solver velocities 70 for that colliding pair 52 of bodies based on the accumulated results of constraint solving. That is, the accumulation of the applied impulses or forces may result in one of the bodies of the pair 52 of bodies having an intermediate solver velocity 70.

As discussed above, the solver 64 may further perform friction solving for relevant contact points between the pair 52 of bodies. The intermediate solver velocities 70 of one or more of the bodies may potentially cause issues for the friction solving that may cause artifacts or errors to occur. However, in one example, the physics engine 26 implemented by the computing device 10 is stateless and deterministic. That is, the physics engine 26 does not introduce extra solver states to propagate error information to subsequent simulation steps in order to mitigate the errors in subsequent steps.

In order to mitigate these potential artifact or errors occurring during friction solving, the physics engine 26 of the computer device 10 according to the present embodiment implements a minimizing function 72 for friction solving. The solver 64 is configured to calculate friction velocities 74 for the bodies of the colliding pair 52 being solved using the minimizing function 72. As illustrated, the solver 64 is configured to calculate the friction velocities 74 for that colliding pair 52 of bodies based on the stored initial velocities 68 and the intermediate solver velocities 70 for that colliding pair 52 of bodies using the minimization function 72. As will be described in more detail below, the minimizing function 72 produces friction velocities 74 that may be used for friction solving to mitigate the potential artifact or errors that may occur from the intermediate solver velocities 70.

The solver 64 may then perform friction solving for the contact points between the pair 52 of bodies, and apply a friction force or impulse based on the calculated friction velocities 74 for that colliding pair 52 of bodies. The solver 64 may then continue to iterate through each colliding pair 52 of bodies in the same manner. The solver 64 may perform several solver iterations until an approximate solution for that simulation step is calculated.

The positions and velocities of the bodies are then updated in the updating phase 46. The results (i.e., a graphical representation of the updated positions of the bodies) are then displayed in the display phase 48. Once the results are displayed, the physics engine 26 may proceed to the next simulation step, and the process loops back to the collision detection phase 42.

FIGS. 5A, 5B, 6A, and 6B illustrate an example friction solve using the minimizing function 72. FIG. 5A has the same initial state of the simulated physical system as in FIG. 3A. As illustrated, the body B1 has an initial velocity V1 directed toward the body B2. During the collision detection phase 42, contact information including a plurality of contact points C1, C2, and C3 are determined and stored in the contact manifolds 58. The physics engine 26 may then process the contact information in the contact manifolds 58 as discussed above using a solving logic 34 during the solving phase 44. Before moving to the solving phase 44, the physics engine 26 determines initial states 68 of the bodies, such as, for example, initial velocities of the bodies. The initial state 68 of the bodies may be stored alongside the collision caches 56, or otherwise stored for later use by the iterative solver. In the example of FIG. 5A, the body B1 has an initial velocity of V1, and the bodies B2, B3, and B5 have initial velocities of 0, as shown in FIG. 5C.

FIG. 5B shows a result of solving the constraint for the contact point C1 between the pair of bodies (B1, B2). The accumulation of the applied forces or impulses for the colliding pair of bodies (B1, B2) results in an intermediate solver velocity V2 for the body B2. After solving the constraints for the colliding pair of bodies (B1, B2), the solving logic 34 may then solve constraints for the next colliding pair of bodies (B2, B3).

When performing friction solving for the contact point C2 between the pair of bodies (B2, B3), the body B2 has an intermediate solver velocity V2 that would potentially cause artifacts or errors in the friction solving. To mitigate these errors, the iterative solver 64 of the physics engine 26 is configured to calculate friction velocities 74 for that colliding pair 52 of bodies based on the stored initial velocities 68 and the intermediate solver velocities 70 for that colliding pair of bodies 52 using a minimization function 72.

In one example, the minimizing function 72 is configured to compare the stored initial velocities 68 to the intermediate solver velocities 70, and select the velocities having a smaller magnitude between the stored initial velocities 68 and the intermediate solver velocities 70 as the friction velocities 74. For example, the minimizing function 72 may be configured to compare values of one or more linear or angular velocities of the stored initial velocities 68 to corresponding one or more linear or angular velocities of the intermediate solver velocities, and select the set of velocities that is smaller as the friction velocities 74. The minimizing function 72 may be configured to perform comparisons for each corresponding velocity components.

In another example, the minimizing function 72 may be configured to calculate a squared length for vector components of the stored initial velocities 68 and a squared length for vector components of the intermediate solver velocities 70. The minimizing function 72 may be configured to perform these squared length calculations separately for the linear and angular velocity components. The minimizing function 72 may then compare the squared length for vector components of the initial velocities to the squared length for vector components of the intermediate solver velocities 70, and select the velocities having the smaller squared length as the friction velocities.

If the velocities have both linear and angular components, the minimizing function 72 may be configured to separately compare and select the linear components from the angular components of the two sets of velocities. Thus, in one example, if the initial velocities have linear components with a smaller squared length but angular components with a larger squared length than the intermediate solver velocities 70, then the resulting selected friction velocities 74 may include values for the linear velocities of the initial velocities and angular velocities of the intermediate solver velocities 70. That is, the minimizing function 72 may be configured to select linear velocities having a smaller squared length for linear vector components between the stored initial velocities and the intermediate solver velocities as linear components of the friction velocities, and select angular velocities having a smaller squared length for angular vector components between the stored initial velocities and the intermediate solver velocities as angular components of the friction velocities.

In these examples, the minimizing function 72 selected the friction velocities 74 based on various magnitudes of velocity. In another example, the minimizing function 72 may be configured to minimize an energy when selecting the friction velocities. For example, the minimizing function 72 may be configured to calculate an initial kinetic energy for a body of the colliding pair of bodies based on the stored initial velocities 68 and an intermediate solver kinetic energy for the body of the colliding pair of bodies based on the intermediate solver velocities 70. For example, minimizing function 72 may be configured to calculate the energies with the following functions:

linearEnergySq=mass*LinearVelocity.lengthSquared angularMomentum=inertia*AngularVelocity rotationalEnergySq=AngularVelocity.dot(angularMomentum)

energy=0.5f*(linearEnergySq+rotationalEnergySq)

The minimizing function 72 may compute such an energy value for both the initial velocities 68 and the intermediate solver velocities 70, and then select the velocities resulting in a smaller kinetic energy for the body as the friction velocities 74.

It should be appreciated that the example techniques for selecting friction velocities based on the stored initial velocities and intermediate solver velocities 70 are merely exemplary, and that other methods and techniques may be used in determining the friction velocities in order to mitigate potential friction artifacts and errors discussed above.

The solver 64 may then perform friction solving for the constraint by applying a friction force or impulse based on the calculated friction velocities 74 for that colliding pair of bodies 52. FIG. 6A continues the example simulation of FIGS. 5A and 5B. The body B2 has a stored initial velocity of zero and an intermediate solver velocity of V2. Thus, when performing the friction solving for the contact point C2 between body B2 and B3, the solver is configured to calculate the friction velocity 74 using the minimizing function 72. In the illustrated example, the initial velocities 68 for the body B2 are less than the intermediate solver velocities 70 for the body B2. Thus, the initial velocities of the body B2, which are zero, are selected as the friction velocity 74. As a result, when performing friction solving, the relative point velocity of the contact point C2 based on the calculate friction velocity is zero, and no friction force or impulse is applied to the contact point. Thus, the body B3 does not gain an intermediate velocity and remains still would be expected by the user due to the body B2 also remaining still at the end of the simulation step. In this manner, the minimizing function 72 for friction solving 72 mitigates the potential errors or artifacts that may occur during friction solving using iterative solvers such as a Gauss-Seidel solver.

Additionally, as the minimizing function 72 chooses the smaller velocity or energy for friction solving, the iterative solver may converge to a stable solution in less iterations compared to iterative solvers that do not implement such a minimizing function 72 for friction solving. In one example, each iterative solving phase 44 of the physics engine 26 has a capped number of solver iterations. In one example, the capped number of solver iterations is less than five. Specifically, the capped number of solver iterations may be four. However, it should be appreciated that the capped number of solver iterations may be set to other values, such as, for example, five, six, etc. By capping the number of solver iterations, the physics engine 26 may significantly reduce the resource requirements for the physics engine 26. Typically, iterative solvers require at least eight or more solver iterations to converge to an approximately stable solution. In contrast, by implementing the minimizing function 72, the physics engine 26 may cap the number of solver iterations to four, while still converging to approximately stable solutions for simulated physical systems.

Additionally, by mitigating artifacts and errors that may occur during friction solving with iterative solvers, such as Gauss-Seidel solvers, without introducing extra states, the physics engine 26 may be implemented in a stateless and deterministic configuration. As discussed above, the stateless and deterministic configuration for the physics engine 26 provides potential benefits in multiplayer online application scenarios as well as when hardware accelerating the physics engine 26 using a GPU.

Figure 7:
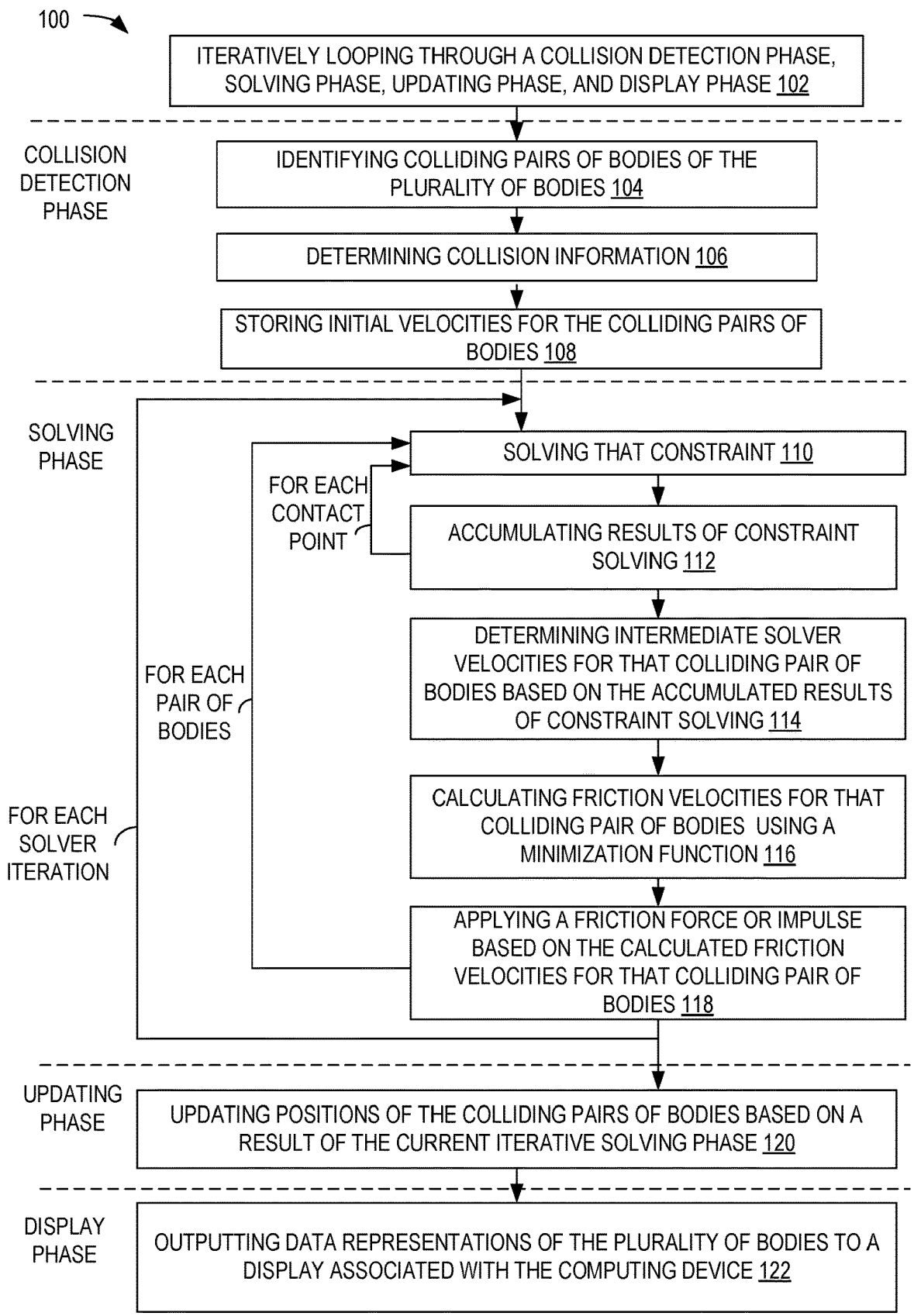
FIG. 7 is a flowchart of a method for performing friction solving using a minimization function, according to one embodiment of the present disclosure.

FIG. 7 is a flow chart of a method for user with a computing device, for friction solving for rigid body dynamics using a minimizing function. It will be appreciated that method 100 may be executed using the hardware describe above, or using other suitable hardware. For example, the method 100 may be executed at a physics engine 26 executed by a processor 12 of a computing device 10 to simulate real-time rigid body dynamics of a simulated physical system including a plurality of bodies.

At 102, the method may include iteratively looping through a collision detection phase, solving phase, updating phase, and display phase. Steps 104-108 are executed in a collision detection phase. At 104, the method may include identifying colliding pairs of bodies of the plurality of bodies. At 106, the method may include, for each identified pair, determining collision information including a plurality of constraints for the identified colliding pairs of bodies. At 108, the method may include storing initial velocities for the colliding pairs of bodies.

Steps 110-118 are executed in an iterative solving phase. Steps 110-118 may be implemented by an iterative solver, such as, for example, a Gauss-Seidel solver. Steps 110-118 may be looped for each solver iteration. In one example, the solver may be configured to have a capped number of solver iterations. In one example, the capped number of solver iterations is less than five, more preferably four. Steps 110-112 may be looped for one or more constraints between a colliding pair of bodies. At step 110, the method may include solving that constraint. At step 112, the method may include, accumulating results of constraint solving.

At step 114, the method may include determining intermediate solver velocities for that colliding pair of bodies based on the accumulated results of constraint solving. At 116, the method may include calculating friction velocities for that colliding pair of bodies based on the stored initial velocities and the intermediate solver velocities for that colliding pair of bodies using a minimization function. At method 118, the method may include applying a friction force or impulse based on the calculated friction velocities for that colliding pair of bodies. The loop of steps 110-112 and steps 114-118 may be looped for each pair of bodies in the system. After looping steps 110-118 for each pair of bodies, one solver iteration is completed.

Step 120 is executed in an updating phase. At 120, the method may include updating positions of the colliding pairs of bodies based on a result of the current iterative solving phase.

Step 122 is executed in a display phase. At 122, the method may include outputting data representations of the plurality of bodies to a display associated with the computing device.

The method 100 may be implemented using a stateless and deterministic physics engine. The steps of the method 100 may be hardware accelerated using a GPU, or another type of hardware acceleration device.

While the illustrative embodiments have been described using two-dimensional graphics as examples for simplicity of explanation, it will be appreciated that the techniques described herein apply equally to three-dimensional representations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
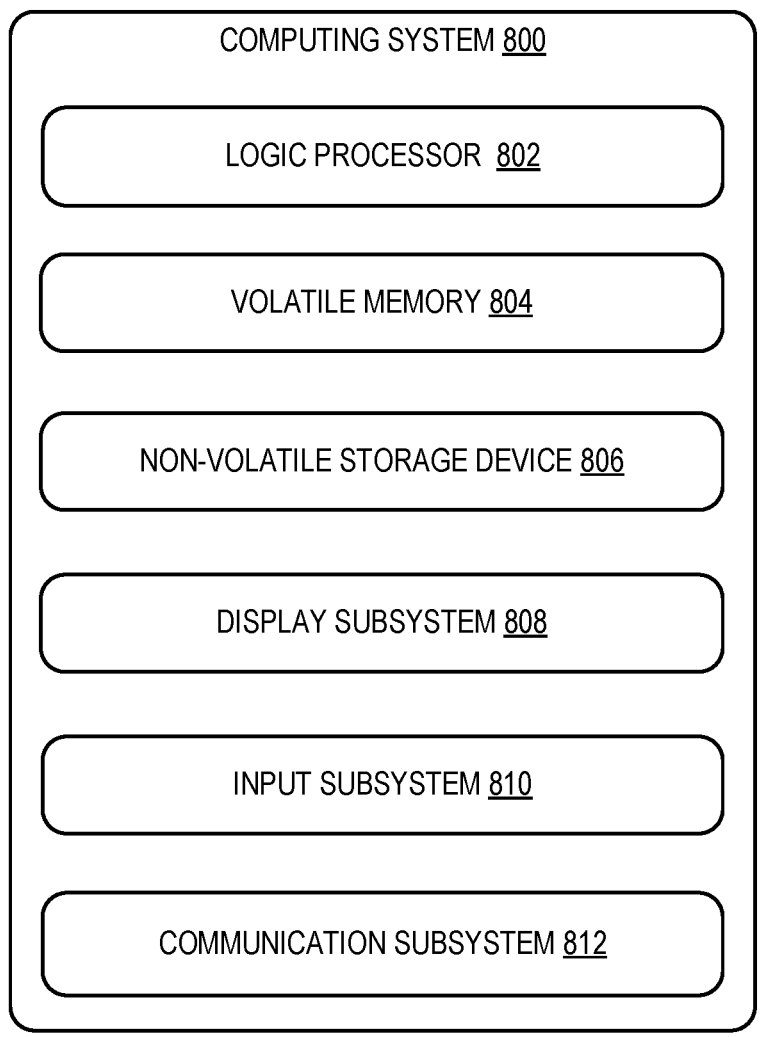
FIG. 8 is a schematic depiction of an example computer device that may be used as the computing device of FIG. 1.

FIG. 8 schematically shows a non-limiting embodiment of a computing system 800 that can enact one or more of the methods and processes described above. Computing system 800 is shown in simplified form. Computing system 800 may embody the computer device 10 described above and illustrated in FIG. 1. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a computing device comprising a processor configured to execute a physics engine to simulate real-time rigid body dynamics of a simulated physical system including a plurality of bodies. The physics engine is configured to iteratively loop through a collision detection phase, an iterative solving phase, updating phase, and display phase. In a current collision detection phase, the physic engine is configured to identify colliding pairs of bodies of the plurality of bodies, determine collision information including a plurality of constraints for the identified colliding pairs of bodies, and store initial velocities for the colliding pairs of bodies. In a current iterative solving phase, the physics engine is configured to, for each solver iteration, for one or more colliding pairs of bodies, for one or more constraints between that colliding pair of bodies, solve that constraint, and accumulate results of constraint solving. For that one or more colliding pairs of bodies, the physics engine is configured to determine intermediate solver velocities for that colliding pair of bodies based on the accumulated results of constraint solving, calculate friction velocities for that colliding pair of bodies based on the stored initial velocities and the intermediate solver velocities for that colliding pair of bodies using a minimization function, and apply a friction force or impulse based on the calculated friction velocities for that colliding pair of bodies. In an updating phase, the physics engine is configured to update positions of the colliding pairs of bodies based on a result of the current iterative solving phase. In a display phase, the physics engines is configured to output data representations of the plurality of bodies to a display associated with the computing device. In this aspect, additionally or alternatively, the plurality of constraints may be contact points between colliding pairs of bodies, and to solve a constraint, the physics engine may be configured to calculate a point relative velocity for that contact point, apply a force or impulse to that contact point based on the point relative velocity, and accumulate applied forces or impulses for that colliding pair of bodies. In this aspect, additionally or alternatively, each iterative solving phase may include a capped number of solver iterations. In this aspect, additionally or alternatively, the capped number of solver iterations may be less than five. In this aspect, additionally or alternatively, to calculate friction velocities based on the stored initial velocities and the intermediate solver velocities, the physics engine may be configured to compare the stored initial velocities to the intermediate solver velocities, and select the velocities having a smaller magnitude between the stored initial velocities and the intermediate solver velocities as the friction velocities. In this aspect, additionally or alternatively, to compare the stored initial velocities to the intermediate solver velocities, the physics engine may be configured to calculate a squared length for vector components of the stored initial velocities and a squared length for vector components of the intermediate solver velocities, and select the velocities having the smaller squared length between the stored initial velocities and the intermediate solver velocities as the friction velocities. In this aspect, additionally or alternatively, the physics engine may be configured to select linear velocities having a smaller squared length for linear vector components between the stored initial velocities and the intermediate solver velocities as linear components of the friction velocities, and select angular velocities having a smaller squared length for angular vector components between the stored initial velocities and the intermediate solver velocities as angular components of the friction velocities. In this aspect, additionally or alternatively, to compare the stored initial velocities to the intermediate solver velocities, the physics engine is configured to calculate an initial kinetic energy for a body of the colliding pair of bodies based on the stored initial velocities and an intermediate solver kinetic energy for the body of the colliding pair of bodies based on the intermediate solver velocities, and select the velocities resulting in a smaller kinetic energy for the body as the friction velocities. In this aspect, additionally or alternatively, the physics engine may be stateless and deterministic. In this aspect, additionally or alternatively, the iterative solving phase of the physics engine may be configured to be accelerated by a graphics processing unit.

Another aspect provides a method for use with a computing device, comprising, at a physics engine executed by a processor of the computing device to simulate real-time rigid body dynamics of a simulated physical system including a plurality of bodies, iteratively looping through a collision detection phase, an iterative solving phase, updating phase, and display phase. In a current collision detection phase, the method may further comprise identifying colliding pairs of bodies of the plurality of bodies, determining collision information including a plurality of constraints for the identified colliding pairs of bodies, and storing initial velocities for the colliding pairs of bodies. In a current iterative solving phase, the method may comprise, for each solver iteration, for one or more colliding pairs of bodies, for one or more constraints between that colliding pair of bodies, solving that constraint, and accumulating results of constraint solving. For that one or more colliding pairs of bodies, the method may further comprise determining intermediate solver velocities for that colliding pair of bodies based on the accumulated results of constraint solving, calculating friction velocities for that colliding pair of bodies based on the stored initial velocities and the intermediate solver velocities for that colliding pair of bodies using a minimization function, applying a friction force or impulse based on the calculated friction velocities for that colliding pair of bodies. In an updating phase, the method may further comprise updating positions of the colliding pairs of bodies based on a result of the current iterative solving phase. In a display phase, the method may further comprise outputting data representations of the plurality of bodies to a display associated with the computing device. In this aspect, additionally or alternatively, the plurality of constraints may be contact points between colliding pairs of bodies, and solving a constraint may further comprise calculating a point relative velocity for that contact point, applying a force or impulse to that contact point based on the point relative velocity, and accumulating applied forces or impulses for that colliding pair of bodies. In this aspect, additionally or alternatively, each iterative solving phase may include a capped number of solver iterations. In this aspect, additionally or alternatively, the capped number of solver iterations may be less than five. In this aspect, additionally or alternatively, calculating friction velocities based on the stored initial velocities and the intermediate solver velocities may further comprise comparing the stored initial velocities to the intermediate solver velocities, and selecting the velocities having a smaller magnitude between the stored initial velocities and the intermediate solver velocities as the friction velocities. In this aspect, additionally or alternatively, comparing the stored initial velocities to the intermediate solver velocities may further comprise calculating a squared length for vector components of the stored initial velocities and a squared length for vector components of the intermediate solver velocities, and selecting the velocities having the smaller squared length between the stored initial velocities and the intermediate solver velocities as the friction velocities. In this aspect, additionally or alternatively, the method may further comprise selecting linear velocities having a smaller squared length for linear vector components between the stored initial velocities and the intermediate solver velocities as linear components of the friction velocities, and selecting angular velocities having a smaller squared length for angular vector components between the stored initial velocities and the intermediate solver velocities as angular components of the friction velocities. In this aspect, additionally or alternatively, comparing the stored initial velocities to the intermediate solver velocities may further comprise calculating an initial kinetic energy for a body of the colliding pair of bodies based on the stored initial velocities and an intermediate solver kinetic energy for the body of the colliding pair of bodies based on the intermediate solver velocities, and selecting the velocities resulting in a smaller kinetic energy for the body as the friction velocities. In this aspect, additionally or alternatively, the iterative solving phase of the physics engine may be configured to be accelerated by a graphics processing unit of the computing device.

Another aspect provides a computing device, comprising a processor configured to execute a physics engine to simulate real-time rigid body dynamics of a simulated physical system including a plurality of bodies. The physics engine is configured to iteratively loop through a collision detection phase, an iterative solving phase, updating phase, and display phase. In a current collision detection phase, the physics engine is configured to identify colliding pairs of bodies of the plurality of bodies, determine collision information including a plurality of constraints for the identified colliding pairs of bodies, and store initial state data for the colliding pairs of bodies. In a current iterative solving phase, the physics engines is configured to, for each solver iteration, for one or more colliding pairs of bodies, for one or more constraints between that colliding pair of bodies, solve that constraint, and accumulate results of constraint solving. For that one or more colliding pairs of bodies, the physics engines is further configured to determine intermediate state data for that colliding pair of bodies, calculate friction state data for that colliding pair of bodies based on the stored initial state data and the intermediate state data for that colliding pair of bodies, and solve for friction for that colliding pair of bodies based on the calculated friction state data. In an updating phase, the physics engine is configured to update positions of the colliding pairs of bodies based on a result of the current iterative solving phase. In a display phase, the physics engine is configured to output data representations of the plurality of bodies to a display associated with the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing device, comprising:
a processor configured to execute a physics engine to simulate real-time rigid body dynamics of a simulated physical system including a plurality of bodies, wherein the physics engine is deterministic and does not maintain state data other than respective positions and velocities of the plurality of bodies between successive timesteps, the physics engine being configured to:
iteratively loop through a collision detection phase, an iterative solving phase, updating phase, and display phase;
in a current collision detection phase:
identify colliding pairs of bodies of the plurality of bodies;
determine collision information including a plurality of position or velocity constraints for the identified colliding pairs of bodies; and
store initial velocities for the colliding pairs of bodies;
in a current iterative solving phase:
for each solver iteration:
for one or more colliding pairs of bodies:
for one or more position or velocity constraints between that colliding pair of bodies:
solve that position or velocity constraint;
apply a force or impulse to each of the colliding pair of bodies at a contact point of the colliding pair of bodies based on the solving of each position or velocity constraint; and
accumulate results of constraint solving by accumulating the applied forces or impulses;
determine intermediate solver velocities at the contact point between the colliding pair of bodies based on the accumulated results of constraint solving;
calculate friction velocities for that colliding pair of bodies based on the stored initial velocities and the intermediate solver velocities at the contact point between that colliding pair of bodies using a minimization function, wherein the minimization function selects a smaller of the stored initial velocities and the intermediate solver velocities to compute the friction velocities; and
apply a friction force or impulse based on the calculated friction velocities for that colliding pair of bodies;
in an updating phase:

update positions of the colliding pairs of bodies based on a result of the current iterative solving phase; and in a display phase:
output data representations of the plurality of bodies to a display associated with the computing device.

2. The computing device of claim 1, wherein the plurality of position or velocity constraints are constraints on the contact points between the colliding pairs of bodies; and
wherein to solve a constraint, the physics engine is configured to:
calculate a point relative velocity for that contact point; and
compute the force or impulse applied to that contact point based on the point relative velocity.

3. The computing device of claim 1, wherein each iterative solving phase includes a capped number of solver iterations.

4. The computing device of claim 3, wherein the capped number of solver iterations is less than five.

5. The computing device of claim 1, wherein to calculate friction velocities based on the stored initial velocities and the intermediate solver velocities, the physics engine is configured to:
compare the stored initial velocities to the intermediate solver velocities; and
select the velocities having a smaller magnitude between the stored initial velocities and the intermediate solver velocities as the friction velocities.

6. The computing device of claim 5, wherein to compare the stored initial velocities to the intermediate solver velocities, the physics engine is configured to:
calculate a squared length for vector components of the stored initial velocities and a squared length for vector components of the intermediate solver velocities; and
select the velocities having the smaller squared length between the stored initial velocities and the intermediate solver velocities as the friction velocities.

7. The computing device of claim 6, wherein the physics engine is configured to:
select linear velocities having a smaller squared length for linear vector components between the stored initial velocities and the intermediate solver velocities as linear components of the friction velocities; and
select angular velocities having a smaller squared length for angular vector components between the stored initial velocities and the intermediate solver velocities as angular components of the friction velocities.

8. The computing device of claim 5, wherein to compare the stored initial velocities to the intermediate solver velocities, the physics engine is configured to:
calculate an initial kinetic energy for a body of the colliding pair of bodies based on the stored initial velocities and an intermediate solver kinetic energy for the body of the colliding pair of bodies based on the intermediate solver velocities; and
select the velocities resulting in a smaller kinetic energy for the body as the friction velocities.

9. The computing device of claim 1, wherein the iterative solving phase of the physics engine is configured to be accelerated by a graphics processing unit.

10. A method for use with a computing device, comprising:
at a physics engine executed by a processor of the computing device to simulate real-time rigid body dynamics of a simulated physical system including a plurality of bodies, wherein the physics engine is deterministic and does not maintain state data other than respective positions and velocities of the plurality of bodies between successive timesteps:
iteratively looping through a collision detection phase, an iterative solving phase, updating phase, and display phase;
in a current collision detection phase:
identifying colliding pairs of bodies of the plurality of bodies;
determining collision information including a plurality of position or velocity constraints for the identified colliding pairs of bodies; and
storing initial velocities for the colliding pairs of bodies;
in a current iterative solving phase:
for each solver iteration:
for one or more colliding pairs of bodies:
for one or more position or velocity constraints between that colliding pair of bodies:
solving that position or velocity constraint;
applying a force or impulse to each of the colliding pair of bodies at a contact point of the colliding pair of bodies based on the solving of each position or velocity constraint; and
accumulating results of constraint solving by accumulating the applied forces or impulses;
determining intermediate solver velocities at the contact point between the colliding pair of bodies based on the accumulated results of constraint solving;
calculating friction velocities for that colliding pair of bodies based on the stored initial velocities and the intermediate solver velocities at the contact point between that colliding pair of bodies using a minimization function, wherein the minimization function selects a smaller of the stored initial velocities and the intermediate solver velocities to compute the friction velocities; and
applying a friction force or impulse based on the calculated friction velocities for that colliding pair of bodies;
in an updating phase:
updating positions of the colliding pairs of bodies based on a result of the current iterative solving phase; and
in a display phase:
outputting data representations of the plurality of bodies to a display associated with the computing device.

11. The method of claim 10, wherein the plurality of position or velocity constraints are constraints on the contact points between the colliding pairs of bodies; and
wherein solving a constraint further comprises:
calculating a point relative velocity for that contact point; and
computing the force or impulse applied to that contact point based on the point relative velocity.

12. The method of claim 11, wherein each iterative solving phase includes a capped number of solver iterations.

13. The method of claim 12, wherein the capped number of solver iterations is less than five.

14. The method of claim 10, wherein calculating friction velocities based on the stored initial velocities and the intermediate solver velocities further comprises:

comparing the stored initial velocities to the intermediate solver velocities; and selecting the velocities having a smaller magnitude between the stored initial velocities and the intermediate solver velocities as the friction velocities.

15. The method of claim 14, wherein comparing the stored initial velocities to the intermediate solver velocities further comprises:

calculating a squared length for vector components of the stored initial velocities and a squared length for vector components of the intermediate solver velocities; and selecting the velocities having the smaller squared length between the stored initial velocities and the intermediate solver velocities as the friction velocities.

16. The method of claim 15, further comprising:

selecting linear velocities having a smaller squared length for linear vector components between the stored initial velocities and the intermediate solver velocities as linear components of the friction velocities; and selecting angular velocities having a smaller squared length for angular vector components between the stored initial velocities and the intermediate solver velocities as angular components of the friction velocities.

17. The method of claim 14, wherein comparing the stored initial velocities to the intermediate solver velocities further comprises:

calculating an initial kinetic energy for a body of the colliding pair of bodies based on the stored initial velocities and an intermediate solver kinetic energy for the body of the colliding pair of bodies based on the intermediate solver velocities; and selecting the velocities resulting in a smaller kinetic energy for the body as the friction velocities.

18. The method of claim 10, wherein the iterative solving phase of the physics engine is configured to be accelerated by a graphics processing unit of the computing device.

19. A computing device, comprising:

a processor configured to execute a physics engine to simulate real-time rigid body dynamics of a simulated physical system including a plurality of bodies, wherein the physics engine is deterministic and does not maintain state data other than respective positions and velocities of the plurality of bodies between successive timesteps, the physics engine being configured to:

iteratively loop through a collision detection phase, an iterative solving phase, updating phase, and display phase;

in a current collision detection phase:
identify colliding pairs of bodies of the plurality of bodies;
determine collision information including a plurality of position or velocity constraints for the identified colliding pairs of bodies; and
store initial state data for the colliding pairs of bodies;

in a current iterative solving phase:
for each solver iteration:
for one or more colliding pairs of bodies:
for one or more position or velocity constraints between that colliding pair of bodies:
solve that position or velocity constraint;
apply a force or impulse to each of the colliding pair of bodies at a contact point of the colliding pair of bodies based on the solving of each position or velocity constraint; and accumulate results of constraint solving by accumulating the applied forces or impulses;
determine intermediate state data at the contact point between the colliding pair of bodies based on the accumulated results of constraint solving;
calculate friction state data for that colliding pair of bodies based on the stored initial state data and the intermediate state data at the contact point between that colliding pair of bodies;
solve for friction at the contact point between that colliding pair of bodies based on the calculated friction state data;

in an updating phase:
update positions of the colliding pairs of bodies based on a result of the current iterative solving phase; and in a display phase:
output data representations of the plurality of bodies to a display associated with the computing device.

20. A computing device, comprising:

a processor configured to execute a physics engine configured to:

store initial velocities for a colliding pair of bodies;
determine one or more position or velocity constraints for the colliding pair of bodies;
solve the one or more position or velocity constraints;
apply one or more forces or impulses to each body of the colliding pair of bodies based on the solving of each position or velocity constraint;
accumulate the one or more applied forces or impulses to obtain accumulated results of constraint solving;
determine intermediate solver velocities for the colliding pair of bodies based on the accumulated results of constraint solving;
calculate friction velocities for that colliding pair of bodies based on the stored initial velocities and the intermediate solver velocities using a minimization function, wherein the minimization function selects a smaller of the stored initial velocities and the intermediate solver velocities to compute the friction velocities;
apply a friction force or impulse based on the calculated friction velocities for the colliding pair of bodies;
update positions of the colliding pairs of bodies based on the accumulated results of constraint solving and the applied friction force or impulse; and
output data representations of the plurality of bodies to a display associated with the computing device.

21. The computing device of claim 20, wherein the minimization function selects a smaller of the stored initial velocities and the intermediate solver velocities to compute the friction velocities, by:

(a) comparing the stored initial velocities to the intermediate solver velocities, and selecting the velocities having a smaller magnitude between the stored initial velocities and the intermediate solver velocities as the friction velocities;

(b) calculating a squared length for vector components of the stored initial velocities and a squared length for vector components of the intermediate solver velocities, and selecting the velocities having a smaller squared length between the stored initial velocities and the intermediate solver velocities as the friction velocities;

(c) selecting linear velocities having a smaller squared length for linear vector components between the stored initial velocities and the intermediate solver velocities as linear components of the friction velocities, and selecting angular velocities having a smaller squared length for angular vector components between the stored initial velocities and the intermediate solver velocities as angular components of the friction velocities; or (d) calculating an initial kinetic energy for a body of the colliding pair of bodies based on the stored initial velocities and an intermediate solver kinetic energy for the body of the colliding pair of bodies based on the intermediate solver velocities, and selecting the velocities resulting in a smaller kinetic energy for the body as the friction velocities.

\* \* \* \* \*